United States Patent
Lundquist et al.

(10) Patent No.: US 11,119,887 B2
(45) Date of Patent: Sep. 14, 2021

(54) ATTACHING METADATA TO LINES OF CODE FOR ALERTING TO CHANGES IN THE CODE

(71) Applicant: INTERNATIONAL BUSINESS MACHINES CORPORATION, Armonk, NY (US)

(72) Inventors: Leslie Lundquist, Auburn, WA (US); Barbara Elizabeth Wang, Austin, TX (US); Priya Ajay Ingle, Austin, TX (US); Sangeetha Srikanth, Austin, TX (US); Johnny Shieh, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 6 days.

(21) Appl. No.: 16/204,092

(22) Filed: Nov. 29, 2018

(65) Prior Publication Data

US 2020/0174907 A1    Jun. 4, 2020

(51) Int. Cl.
*G06F 11/36* (2006.01)
*G06F 8/33* (2018.01)
*G06F 8/73* (2018.01)
*G06F 40/117* (2020.01)

(52) U.S. Cl.
CPC ........... *G06F 11/3604* (2013.01); *G06F 8/33* (2013.01); *G06F 8/73* (2013.01); *G06F 11/3624* (2013.01); *G06F 40/117* (2020.01)

(58) Field of Classification Search
CPC ............... G06F 11/3604; G06F 40/117; G06F 11/3624; G06F 8/33; G06F 8/73
See application file for complete search history.

(56) References Cited

U.S. PATENT DOCUMENTS

| | | | | |
|---|---|---|---|---|
| 6,356,285 B1 * | 3/2002 | Burkwald | ................. | G06F 8/75 345/440 |
| 6,698,013 B1 * | 2/2004 | Bertero | ...................... | G06F 8/71 717/101 |
| 7,730,466 B2 * | 6/2010 | Wilson | ...................... | G06F 8/33 717/141 |
| 8,473,971 B2 * | 6/2013 | Meijer | ..................... | G06F 9/449 719/331 |
| 8,495,100 B2 * | 7/2013 | Cheung | ..................... | G06F 8/71 707/794 |
| 8,589,880 B2 * | 11/2013 | Jones | ......................... | G06F 8/20 717/124 |
| 8,732,732 B2 * | 5/2014 | Meijer | ..................... | G06F 8/31 719/331 |

(Continued)

*Primary Examiner* — Matthew J Brophy
(74) *Attorney, Agent, or Firm* — Noah Sharkan; Andrew D. Wright; Roberts Calderon Safran & Cole, P.C.

(57) ABSTRACT

A computer-implemented method includes: receiving, by a computer device, input to tag at least one line of code with one of plural predefined types of metadata tags, wherein the at least one line of code is a subset of a source code that is stored in a code repository and editable by plural different users via a client source code editor program; tagging, by the computer device, the at least one line of code with the one of the plural predefined types of metadata tags; detecting, by the computer device, a change to the at least one line of code after the tagging; and generating, by the computer device, an alert based on the detecting the change to the at least one line of code.

20 Claims, 3 Drawing Sheets

(56) References Cited

U.S. PATENT DOCUMENTS

| | | | | |
|---|---|---|---|---|
| 8,739,121 B1* | 5/2014 | Jones | G06F 8/73 | 717/113 |
| 9,043,753 B2* | 5/2015 | Fox | G06F 8/36 | 717/120 |
| 9,086,885 B2* | 7/2015 | Canter | G06F 8/33 | |
| 9,495,134 B2* | 11/2016 | Brandt | G06F 8/33 | |
| 9,632,771 B2* | 4/2017 | Toub | G06F 8/73 | |
| 9,733,933 B1* | 8/2017 | Arquero | G06F 8/71 | |
| 10,127,019 B2* | 11/2018 | Polisky | G06F 8/70 | |
| 10,209,963 B2* | 2/2019 | Hutchison | G06F 3/0673 | |
| 10,289,407 B1* | 5/2019 | Turner | G06F 3/14 | |
| 10,353,796 B2* | 7/2019 | Frenkiel | G06F 11/3604 | |
| 10,489,122 B1* | 11/2019 | Abbott | G06F 8/33 | |
| 10,635,566 B1* | 4/2020 | Talluri | G06F 11/3404 | |
| 10,635,855 B1* | 4/2020 | Schroeder | G06F 40/169 | |
| 2003/0163323 A1* | 8/2003 | Bluvband | G10L 13/00 | 704/275 |
| 2007/0006152 A1* | 1/2007 | Ahmed | G06F 21/12 | 717/122 |
| 2007/0055978 A1* | 3/2007 | Meijer | G06F 8/31 | 719/331 |
| 2007/0283325 A1 | 12/2007 | Kumar et al. | | |
| 2007/0288889 A1* | 12/2007 | Harrison | G06F 8/73 | 717/110 |
| 2009/0133006 A1* | 5/2009 | Cheung | G06F 8/71 | 717/144 |
| 2010/0211932 A1* | 8/2010 | Jones | G06F 8/20 | 717/124 |
| 2013/0290987 A1* | 10/2013 | Meijer | G06F 8/31 | 719/331 |
| 2014/0173561 A1* | 6/2014 | Toub | G06F 8/73 | 717/123 |
| 2014/0181789 A1* | 6/2014 | Canter | G06F 8/34 | 717/113 |
| 2014/0250422 A1* | 9/2014 | Bank | G06F 8/34 | 717/109 |
| 2015/0339104 A1* | 11/2015 | Frenkiel | G06F 9/44 | 717/113 |
| 2015/0347098 A1* | 12/2015 | Gottumukkala | G06F 8/60 | 717/106 |
| 2016/0070547 A1* | 3/2016 | Ramanathan | G06F 8/71 | 717/107 |
| 2016/0266896 A1 | 9/2016 | Fan et al. | | |
| 2016/0292066 A1 | 10/2016 | Stevens et al. | | |
| 2017/0147298 A1* | 5/2017 | Ramanathan | G06F 8/71 | |
| 2017/0316220 A1* | 11/2017 | Eldar | G06F 21/6245 | |
| 2017/0329992 A1* | 11/2017 | Eldar | G06F 3/04886 | |
| 2018/0181389 A1* | 6/2018 | Frenkiel | G06F 8/36 | |
| 2018/0260193 A1* | 9/2018 | Polisky | G06F 8/70 | |
| 2019/0332968 A1* | 10/2019 | Fu | G06N 7/005 | |

* cited by examiner

ATTACHING METADATA TO LINES OF CODE FOR ALERTING TO CHANGES IN THE CODE

BACKGROUND

The present invention relates generally to version control systems and, more particularly, to systems and methods for attaching metadata to lines of code for alerting to changes in the code.

Code repository programs (also referred to as source code handling programs or source code control platforms) are programs that provide version control functions for files containing source code. Comments are commonly used to document lines of source code. Often, comments are created as code is input into a file or shortly thereafter. Because of this, comments have a distinct relationship to the timeframe the code was created.

SUMMARY

In a first aspect of the invention, there is a computer-implemented method including: receiving, by a computer device, input to tag at least one line of code with one of plural predefined types of metadata tags, wherein the at least one line of code is a subset of a source code that is stored in a code repository and editable by plural different users via a client source code editor program; tagging, by the computer device, the at least one line of code with the one of the plural predefined types of metadata tags; detecting, by the computer device, a change to the at least one line of code after the tagging; and generating, by the computer device, an alert based on the detecting the change to the at least one line of code.

In another aspect of the invention, there is a computer program product including a computer readable storage medium having program instructions embodied therewith. The program instructions are executable by a computer device to cause the computer device to: receive input to tag at least one line of code with one of plural predefined types of metadata tags, wherein the at least one line of code is a subset of a source code that is stored in a code repository and editable by plural different users via a client source code editor program; tag the at least one line of code with the one of the plural predefined types of metadata tags; detect a change to the at least one line of code after the tagging; and generate an alert based on the detecting the change to the at least one line of code.

In another aspect of the invention, there is system including a processor, a computer readable memory, and a computer readable storage medium. The system includes: program instructions to receive input to tag at least one line of code with one of plural predefined types of metadata tags, wherein the at least one line of code is a subset of a source code that is stored in a code repository and editable by plural different users via a client source code editor program; program instructions to tag the at least one line of code with the one of the plural predefined types of metadata tags; program instructions to detect a change to the at least one line of code after the tagging; and program instructions to generate an alert based on the detecting the change to the at least one line of code. The receiving includes: receiving user input indicating the at least one line of code; and receiving user input indicating the one of the plural predefined types of metadata tags. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to version control systems and, more particularly, to systems and methods for attaching metadata to lines of code for alerting to changes in the code. Implementations of the invention provide a system and method for using metadata tagging that can be put in lines of code, via a graphic user interface (GUI), wherein the tags trigger specific actions/alerts/comments if those lines of code are affected (e.g., if tagged code is edited, or some other code is edited but impacts tagged code). In embodiments, when the system detects a change in the tagged code, the system provides the user with an alert of one or more actions that should be taken due to the place and type of change made to the alert area. For example, if code is changed, the alert may warn about comments. In another example, if comments are changed, the alert may warn the user to check multiple areas of code (e.g., user declares some function is no longer valid, then areas (code) where the calls may be used should be checked to see if they should be changed.) In this manner, implementations of the invention addresses situations in which a change to a certain area of code would cause other areas to break, by letting users use the metadata tags to set a marker that denotes and describes actions that must be taken when changing the metadata-marked areas of code. In this manner, the tags function as a type of virtual warning beacon for users (e.g., programmers) that subsequently view and/or edit the code.

In embodiments, the metadata tags are represented by symbols that indicate specific types of actions that need to be performed when they appear. In embodiments, the metadata tags are invisible to users viewing and/or editing the code; however, the user may provide input to make the tags visible in the user interface.

In embodiments, the system specifies predefined types of metadata tags (which may be characters, for example), and provides an interface for associating those tags with lines of source code. In accordance with aspects of the invention, a type of metadata tag indicates that certain other areas of code should be changed to match the area marked by metadata. Another type of metadata tag may indicate that certain comments describing the functionality of the code should be edited to correctly describe the code's new behavior. Another type of metadata tag may indicate that a certain user (e.g., a developer or architect) should be notified if a portion of code is altered.

Implementations of the invention are particularly advantageous when creating code for concurrent systems in the control plane of a cloud or operating system. These concurrent systems are well-known to be difficult to debug because of "race conditions," which means that outcomes of code execution can vary unexpectedly based on the timing with which the input data is entered. Using metadata tagging as described herein, a user (e.g., programmer) can indicate which portions of code are subject to opening up a race condition if altered, and indicate which related portions of source code must be changed accordingly to prevent such defects from being caused.

Embodiments of the invention improve the technical field of code editing and version control systems by providing users with new computer-based tools that specify particular actions to be taken when a tagged line of code is changed. Embodiments of the invention employ an unconventional arrangement of steps including: receiving, by a computer device, input to tag at least one line of code with one of plural predefined types of metadata tags, wherein the at least one line of code is a subset of a source code that is stored in a code repository and editable by plural different users via a client source code editor program; tagging, by the computer device, the at least one line of code with the one of the plural predefined types of metadata tags; detecting, by the computer device, a change to the at least one line of code after the tagging; and generating, by the computer device, an alert based on the detecting the change to the at least one line of code. The steps themselves are unconventional, and the combination of the steps is also unconventional.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
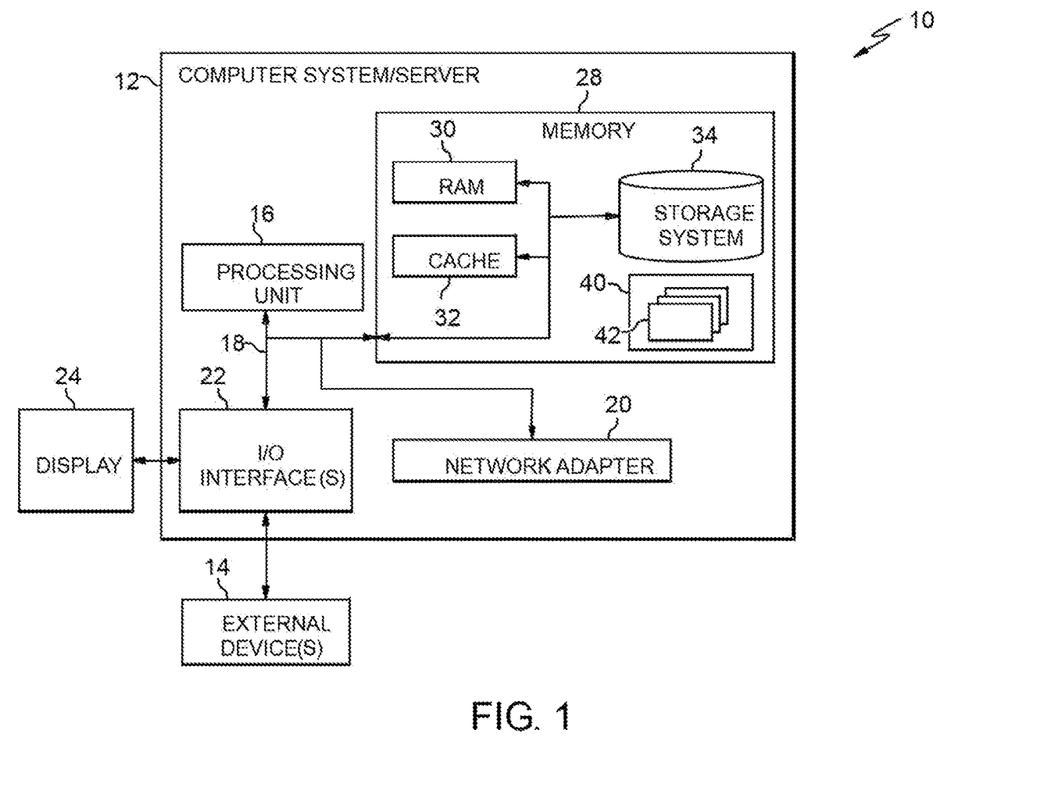
FIG. 1 depicts a computer infrastructure according to an embodiment of the present invention.

Referring now to FIG. 1, a schematic of an example of a computer infrastructure is shown. Computer infrastructure 10 is only one example of a suitable computer infrastructure and is not intended to suggest any limitation as to the scope of use or functionality of embodiments of the invention described herein. Regardless, computer infrastructure 10 is capable of being implemented and/or performing any of the functionality set forth hereinabove.

In computer infrastructure 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computer infrastructure 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
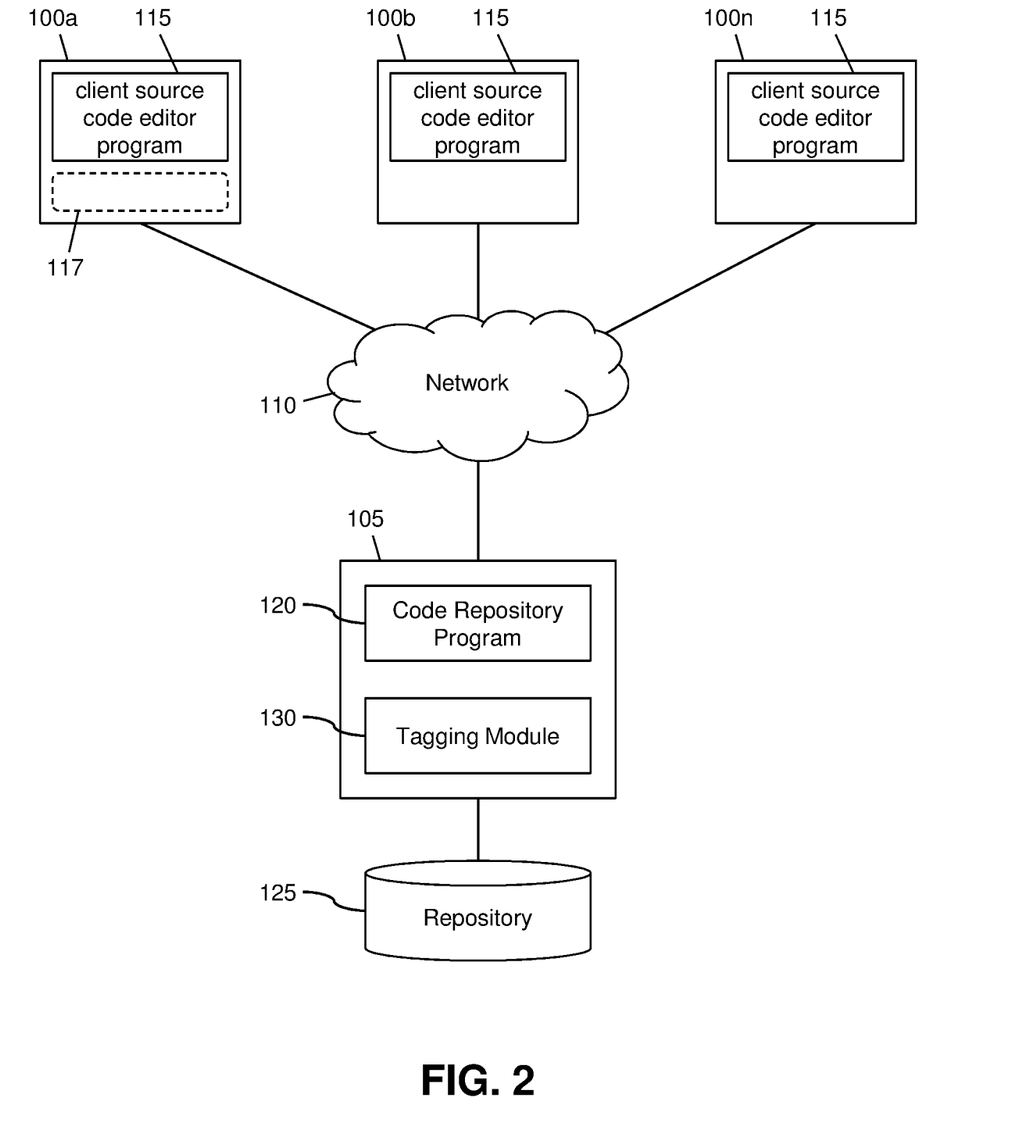
FIG. 2 shows a block diagram of an exemplary environment in accordance with aspects of the invention.

FIG. 2 shows a block diagram of an exemplary environment in accordance with aspects of the invention. In embodiments, the environment includes plural user devices 100a, 100b, . . . , 100n that communicate with a server 105 via a network 110. Each of the user devices 100a-n comprises a computer device such as a desktop computer, laptop computer, tablet computer, smartphone, etc. Each of the user devices 100a-n comprises one or more elements of the computer system 12 of FIG. 1. In implementations, each of the user devices 100a-n stores and runs an instance of a client source code editor program 115 that communicates with a code repository program 120 hosted on the server 105 for editing source code that is stored in repository 125.

The server 105 is a computer device comprising one or more elements of the computer system 12 of FIG. 1. In embodiments, the code repository program 120 is a source code handling program (also referred to as a source code control platform or a version control system) that provides version control functions for files containing source code. In embodiments, the code repository program 120 is configured to permit plural different users (e.g., at user devices 100a-n) to edit source code (e.g., of a file) stored in the repository 125, to track changes made by the users to the source code, and to coordinate work on the source code among the users. The repository 125 may be a storage system such as storage system 34 of FIG. 1.

In an exemplary use case, the code repository program 120 stores a file containing source code in the repository 125. Plural different users may use the different user devices 100a-n to edit the source code of this file. In particular, the client source code editor program 115 on each user device 100a-n may cause the respective user device 100a-n to display a user interface 117 by which the user can provide input (e.g., keyboard strokes, mouse clicks, etc.) to edit the source code stored in the repository 125. In accordance with aspects of the invention, the code repository program 120 receives the user input from the client source code editor program 115 and provides version control functions for the source code that may be edited in this manner by the plural different users.

In embodiments, the network 110 is a communication network such as a LAN, WAN, or the Internet, or a combination of two or more such communication networks. In a cloud computing (e.g., distributed network) implementation, the functions of the server 105 are provided by one or more nodes in a cloud computing environment, e.g., as Software as a Service (Saas).

According to aspects of the invention, the server 105 comprises a tagging module 130 that is configured to perform functions described herein including: receiving input to tag at least one line of code with one of plural predefined types of metadata tags; tagging the at least one line of code with the one of the plural predefined types of metadata tags; detecting a change to the at least one line of code after the tagging; and generating an alert based on the detecting the change to the at least one line of code.

The tagging module 130 may comprise one or more program modules 42 described with respect to FIG. 1. The computational environment 100 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2. For example, in some embodiments, the tagging module 130 comprises one or more extensions or add-ons to the code repository program 120, as depicted in FIG. 2. In other embodiments, the functions of the tagging module 130 are provided as a tool in a toolset provided by the code repository program 120. In other embodiments, the functions of the tagging module are performed by software plugins that reside on each of the user devices 100a-n.

According to aspects of the invention, the tagging module 130 is configured to permit a user to add metadata tags to specific lines of the source code via the user interface 117 of the client source code editor program 115. In embodiments, the metadata tags are invisible in the user interface 117 of other users editing the same source code via their respective instance of the client source code editor program 115. In embodiments, the user interface 117 includes an option by which a user may provide input to selectively switch the metadata tags between visible and invisible in the user interface 117.

In embodiments, the tagging module 130 is configured to monitor the source code, after the tagging, to detect any changes to the lines of source code that are tagged by one or more metadata tags, and to generate an alert based on the detected change. In an example, a first user uses the client source code editor program 115 of the user device 100a to add a metadata tag to lines 5-10 of the source code. Subsequent to this tagging, when any user uses the client source code editor program 115 of any of the user devices 100a-n to change lines 5-10 of the source code, the tagging module 130 detects this change and generates an alert.

In implementations, the metadata tags are selected from a list or menu of predefined types of tags, each of which results in a different alert when the tagging module 130 detects a change in the tagged line of source code. In an example, a first predefined type of tag indicates at least one other line of code to change in response to detecting a change to the tagged line of code. In another example, a second predefined type of tag indicates at least one comment to change in response to detecting a change to the tagged line of code. In another example, a third predefined type of tag indicates a specified user to alert in response to detecting a change to the tagged line of code. In another example, a fourth predefined type of tag indicates a potential race condition in response to detecting a change to the tagged line of code. These examples of tags are not intended to be limiting, and implementations of the invention may utilize other numbers of tags and/or other types of tags.

In accordance with aspects of the invention, a user specifies the metadata tag and the lines of source code via the user interface 117 of the client source code editor program 115. For example, the user may highlight the lines to be tagged with a mouse and/or keyboard input via the user interface 117, after which the user may select one of the predefined types of tag from a drop down menu or other list presented via the user interface 117. In this manner, the user selects the lines of code and the type of tag to apply to the lines of code.

In embodiments, after selecting the line(s) of code and a type of tag (from the plural predefined types available), the user enters additional information that is specific to the type of tag selected. For example, in response to the user selecting the first type of tag, the system may prompt the user to provide input to specify the at least one other line of code to change in response to detecting a change to the tagged line of code. Similarly, in response to the user selecting the second type of tag, the system may prompt the user to provide input to specify the at least one comment to change in response to detecting a change to the tagged line of code. Similarly, in response to the user selecting the third type of tag, the system may prompt the user to provide input to specify a user to notify in response to detecting a change to the tagged line of code. Similarly, in response to the user selecting the fourth type of tag, the system may prompt the user to provide input to describe the potential race condition in response to detecting a change to the tagged line of code.

According to aspects of the invention, the tagging module 130 tags the indicated lines of source code based on receiving the user input specifying the selected line(s) of code, the type of tag, and any additional information as described herein. In embodiments, the tagging comprises storing data associated with the selected line(s) of code in the copy of the file that is stored in the repository 125.

According to aspects of the invention, after tagging the selected line(s) of code as described herein, the tagging module 130 monitors the tagged line(s) of code to detect any changes to the tagged line(s) of code. Such a change may be made by any of the users, including the user that tagged the line(s) of code and/or other users that have access rights to edit the source code of this file.

According to aspects of the invention, in response to detecting a change to the tagged line(s) of code, the tagging module 130 generates an alert. In embodiments, the alert comprises at least one of: sending instruction to the client source code editor program 115 to display an alert in the user interface 117 of the user making the change to the tagged line(s) of code; and sending a message to the user that tagged the line(s) of code. In the first instance, the alert to the user changing the tagged line(s) of code is presented in real time (or near real time) in the user interface 117 as the user is making the change. In the second instance, the message may comprise at least one of: a text message; an email; a telephone call that plays an automated message; and an alert presented in the user interface 117 if the user is logged on to the client source code editor program 115 at the time of the change. These examples of messages are not intended to be limiting, and implementations of the invention may utilize these types and/or other types of messages, including social media based messaging.

In embodiments, the tagged line(s) of code are a subset of the source code. For example, the source code (e.g., file) stored in the repository may comprises dozens, hundreds, or even thousands of lines of code. Implementations of the invention advantageously permit a user to select and tag a subset of lines of the entire source code, wherein the subset can include as few as one line. Then, when the tagged subset of lines is changed by any other user, the system generates an alert based on detecting the change. Conversely, when a user changes another line of the source code that is not included in the tagged subset of lines, the system does not generate the alert. These concepts are illustrated by the following exemplary use cases.

In a first exemplary use case, the source code stored in the repository 125 includes a total of 200 lines. A first user tags lines 4-6 of the source code with the first type of tag. When providing the input to tag lines 4-6, the first user specifies lines 4-6 in the user interface 117, selects the first type of tag from a list or menu in the user interface 117, and provides additional information that lines 118-120 must be changed if lines 4-6 are changed. The system stores this information with a metadata tag associated with lines 4-6. Subsequently, when the first user or any other user changes lines 4-6 of the source code, the system automatically generates an alert in the user interface 117 of the user making the change, wherein the alert notifies the user making the change that lines 118-120 must be changed based on the change to lines 4-6.

With continued reference to the first exemplary use case, after detecting the change to lines 4-6, the system monitors lines 118-120 to detect whether these lines were also changed. In the event that the tagged lines 4-6 are changed and the additional lines 118-120 are not changed (as indicated by the metadata tag), then the system sends a message to the first user that tagged lines 4-6. The message may comprise at least one of: a text message; an email; a telephone call that plays an automated message; and an alert presented in the user interface 117 of the first user. These examples of messages are not intended to be limiting, and implementations of the invention may utilize these types and/or other types of messages, including social media based messaging. In embodiments, the message indicates that the tagged lines (e.g., lines 4-6) were changed and that additional lines (e.g., lines 118-120) were not changed. In this manner, the first user may take appropriate action to examine the changes, make any desired changes, etc.

In a second exemplary use case, the source code stored in the repository 125 includes a total of 200 lines. A first user tags lines 4-6 of the source code with a type of tag. When providing the input to tag lines 4-6, the first user specifies lines 4-6 in the user interface 117, selects the type of tag from a list or menu in the user interface 117, and provides additional information that lines 118-120 must be changed or that lines 160-165 of comments must be changed if lines 4-6 are changed. The system stores this information with a metadata tag associated with lines 4-6. Subsequently, when the first user or any other user changes lines 4-6 of the source code, the system automatically generates an alert in the user interface 117 of the user making the change, wherein the alert notifies the user making the change that lines 118-120 must be changed or that lines 160-165 of comments must be changed based on the change to lines 4-6.

In a third exemplary use case, the source code stored in the repository 125 includes a total of 300 lines. Lines 5-9 set a value for Variable "B" and lines 115-119 rely on (e.g., use) the value of Variable "B". This represents a potential race condition. A first user tags lines 5-9 of the source code with the fourth type of tag. When providing the input to tag lines 5-9, the first user specifies lines 5-9 in the user interface 117, selects the fourth type of tag from a list or menu in the user interface 117, and provides additional information that lines 115-119 rely on Variable "B" that is set at lines 5-9, and that a change to lines 5-9 affects lines 115-119 via the value of Variable "B". The system stores this information with a metadata tag associated with lines 4-6. Subsequently, when the first user or any other user changes lines 4-6 of the source code, the system automatically generates an alert in the user interface 117 of the user making the change, wherein the alert notifies the user making how lines 115-119 are affected by the change to lines 5-9.

In a fourth exemplary use case, the source code stored in the repository 125 includes a total of 300 lines. Lines 5-9 initialize and set a value for Variable "B" and lines 115-119 accesses the value of Variable "B". This represents a potential core dump situation if lines 5-9 are changed to eliminate Variable "B". A first user tags lines 5-9 of the source code with the fourth type of tag. When providing the input to tag lines 5-9, the first user specifies lines 5-9 in the user interface 117, selects the fourth type of tag from a list or menu in the user interface 117, and provides additional information that lines 115-119 rely on Variable "B" that is set at lines 5-9, and that a change to lines 5-9 affects lines 115-119 via the value of Variable "B". The system stores this information with a metadata tag associated with lines 4-6. Subsequently, when the first user or any other user changes lines 4-6 of the source code, the system automatically generates an alert in the user interface 117 of the user making the change, wherein the alert notifies the user making how lines 115-119 are affected by the change to lines 5-9.

Figure 3:
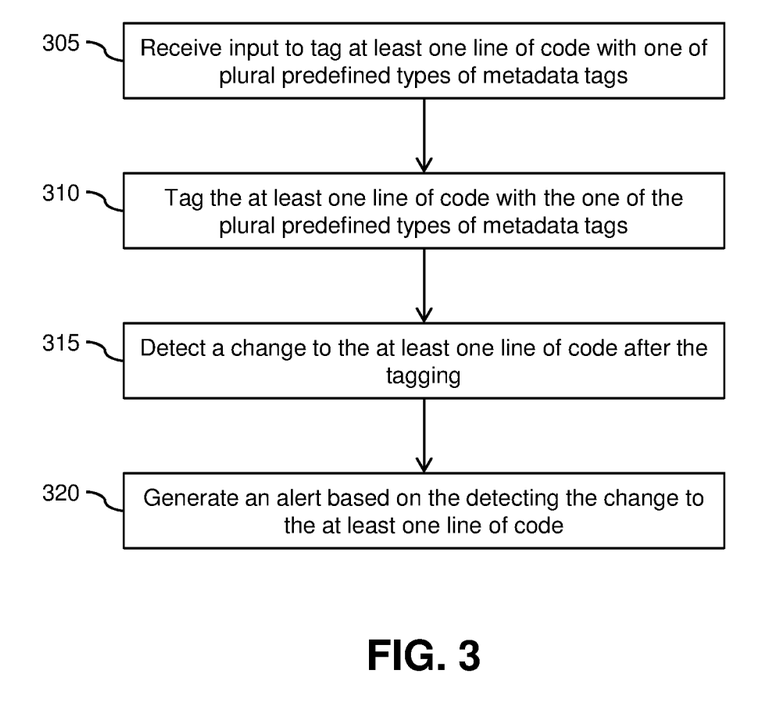
FIG. 3 shows a flowchart of an exemplary method in accordance with aspects of the invention.

FIG. 3 shows a flowchart of an exemplary method in accordance with aspects of the present invention. Steps of the method may be carried out in the environment of FIG. 2 and are described with reference to elements depicted in FIG. 2.

At step 305, the system receives input to tag at least one line of code with one of plural predefined types of metadata tags. In embodiments, and as described with respect to FIG. 2, the tagging module 130 receives input from a user via a user interface 117 of a client source editor program 115. In embodiments, the input comprises: a selection of the lines to be tagged, a selection of a type of tag, and additional information associated with the selected type of tag.

At step 310, the system tags the at least one line of code with the one of the plural predefined types of metadata tags. In embodiments, and as described with respect to FIG. 2, the tagging module 130 stores data defining the selected lines, the type of tag, and the additional information, e.g., in the repository 125.

At step 315, the system detects a change to the at least one line of code after the tagging. In embodiments, and as described with respect to FIG. 2, the tagging module 130 monitors the source code and detects when a user makes a change to any of the tagged lines, e.g., via a user interface 117 of a client source editor program 115.

At step 320, the system generates an alert based on the detecting the change to the at least one line of code. In embodiments, and as described with respect to FIG. 2, in response to detecting a change of at least one of the tagged lines, the tagging module 130 causes the user device to display an alert in the user interface 117. Additionally or alternatively, as described with respect to FIG. 2, the tagging module 130 sends a message to the user indicating that tagged the lines of code have been changed.

In embodiments, the tagging module 130 is configured to analyze the source code and automatically tag lines of the source code based on the analyzing. In embodiments, the tagging module analyzes the source code by comparing lines of the source code to a library of conditions. In embodiments, each of the conditions defined in the library is associated with one of the plural predefined types of metadata tags. In this embodiment, the system automatically tags at least one line of the source code with one of the plural predefined types of metadata tags based on the at least one line of the source code matching the conditions defined in the library. In this embodiment, after such automatic tagging, the system prompts the user (e.g., via the user interface 117) to provide the additional information associated with the applied type of tag.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving, by a computer device, user input to tag at least one line of code with one of plural predefined types of metadata tags, wherein the at least one line of code is a subset of a source code that is stored in a code repository and editable by plural different users via a client source code editor program, wherein the user input includes: a first user input from a first user in a user interface of the client source code editor program, the first user input selecting the at least one line of code; and a second user input from the first user selecting the one of the plural predefined types of metadata tags from a menu or list presented in the user interface, and wherein the plural predefined types of metadata tags include a first type that indicates at least one other line of code to change in response to detecting a change to the at least one line of code;
tagging, by the computer device and in response to the receiving the user input, the at least one line of code with the one of the plural predefined types of metadata tags;
detecting, by the computer device, the change to the at least one line of code after the tagging;
detecting, by the computer device, that the at least one other line of code is not changed in response to detecting the change to the at least one line of code;
generating, by the computer device, an alert which warns the first user about comments that document the at least one line of code based on the detecting the change to the at least one line of code;
sending, by the computer device, to the first user a first message that the at least one other line of code is not changed in response to detecting the at least one other line of code is not changed; and
sending, by the computer device, to a second user a second message in response to the detecting the change to the at least one line of code, wherein the second message is selected from the group consisting of a text message, an email, and a telephone call that plays an automated message.

2. The method of claim 1, wherein the plural predefined types of metadata tags include:
a second type that indicates at least one comment to change in response to detecting the change to the at least one line of code;

a third type that indicates a specified user to alert in response to detecting the change to the at least one line of code; and a fourth type that indicates a potential race condition in response to detecting the change to the at least one line of code.

3. The method of claim 1, further comprising, in response to receiving the second user input selecting the one of the plural predefined types of metadata tags:

prompting the user to provide additional information that is specific to the selected one of the plural predefined types of metadata tags; receiving a third user input defining the additional information; and tagging the at least one line of code with the additional information.

4. The method of claim 3, wherein the additional information specifies the at least one other line of code to change.

5. The method of claim 3, wherein the one of the plural predefined types of metadata tags indicates at least one comment to change in response to detecting the change to the at least one line of code, and the additional information specifies the at least one comment to change.

6. The method of claim 3, wherein the one of the plural predefined types of metadata tags indicates a specified user to alert in response to detecting the change to the at least one line of code, and the additional information specifies the specified user to alert.

7. The method of claim 3, wherein the one of the plural predefined types of metadata tags indicates a potential race condition in response to detecting the change to the at least one line of code, and the additional information specifies the potential race condition.

8. The method of claim 3, wherein:

the first user input selecting the at least one line of code and the second user input selecting the one of the plural predefined types of metadata tags are received from the first user via a first instance of the client source code editor program; and the change to the at least one line of code is detected as being made by the second user via a second instance of the client source code editor program.

9. The method of claim 8, wherein the generating the alert comprises sending instruction to the second instance of the client source code editor program to display the alert in the user interface in real time or near real time as the change to the at least one line of code is detected as being made.

10. The method of claim 8, wherein the generating the alert includes sending an instruction to the client source code editor program to display the alert in the user interface of the client source code editor program, and the first message includes a text message, an email, a telephone call that plays an automated message, and a social media based message.

11. A computer program product, the computer program product comprising a computer readable storage medium having program instructions embodied therewith, the program instructions executable by a computer device to cause the computer device to:

receive user input to tag at least one line of code with one of plural predefined types of metadata tags, wherein the at least one line of code is a subset of a source code that is stored in a code repository and editable by plural different users via a client source code editor program and certain comments triggered by the plural predefined types of metadata tags describe a functionality of the source code that needs editing to describe a behavior of the source code, wherein the user input includes: a first user input from a first user in a user interface of the client source code editor program, the first user input selecting the at least one line of code; and a second user input from the first user selecting the one of the plural predefined types of metadata tags from a menu or list presented in the user interface, and wherein the plural predefined types of metadata tags include a first type that indicates at least one other line of code to change in response to detecting a change to the at least one line of code;

tag the at least one line of code with the one of the plural predefined types of metadata tags in response to the receiving the user input;

detect the change to the at least one line of code after the tagging;

detect that the at least one other line of code is not changed in response to detecting the change to the at least one line of code;

generate an alert which warns the first user about comments that document the at least one line of code based on the detecting the change to the at least one line of code;

send to the first user a first message that the at least one other line of code is not changed in response to detecting the at least one other line of code is not changed; and send a text message, an email, a telephone call that plays an automated message, and a social media based message to a second user in response to the detecting the change to the at least one line of code.

12. The computer program product of claim 11, wherein the plural predefined types of metadata tags include:

a second type that indicates at least one comment to change in response to detecting the change to the at least one line of code;

a third type that indicates a specified user to alert in response to detecting the change to the at least one line of code; and a fourth type that indicates a potential race condition in response to detecting the change to the at least one line of code.

13. The computer program product of claim 11, further comprising, in response to receiving the second user input selecting the one of the plural predefined types of metadata tags: prompting the user to provide additional information that is specific to the selected one of the plural predefined types of metadata tags; receiving a third user input defining the additional information; and tagging the at least one line of code with the additional information.

14. The computer program product of claim 13, wherein:

the first user input selecting the at least one line of code and the second user input selecting the one of the plural predefined types of metadata tags are received from a first user via a first instance of the client source code editor program; and the change to the at least one line of code is detected as being made by the second user via a second instance of the client source code editor program.

15. The computer program product of claim 14, wherein the generating the alert comprises sending instruction to the second instance of the client source code editor program to display the alert in the user interface in real time or near real time as the change to the at least one line of code is detected as being made, and the first message to the first user includes a social media based message to the first user.

16. A system comprising:

a processor, a computer readable memory, and a computer readable storage medium;

program instructions to receive user input to tag at least one line of code with one of plural predefined types of metadata tags, wherein the at least one line of code is a subset of a source code that is stored in a code repository and editable by plural different users via a client source code editor program, wherein the user input includes: a first user input from a first user in a user interface of the client source code editor program, the first user input selecting the at least one line of code; and a second user input from the first user selecting the one of the plural predefined types of metadata tags from a menu or list presented in the user interface, and wherein the plural predefined types of metadata tags include a first type that indicates at least one other line of code to change in response to detecting a change to the at least one line of code;

program instructions to tag the at least one line of code with the one of the plural predefined types of metadata tags in response to the receiving the user input;

program instructions to detect the change to the at least one line of code after the tagging;

program instructions to detect that the at least one other line of code is not changed in response to detecting the change to the at least one line of code;

program instructions to generate an alert which warns the first user about comments that document the at least one line of code based on the detecting the change to the at least one line of code;

program instructions to send to the first user a first message that the at least one other line of code is not changed in response to detecting the at least one other line of code is not changed; and program instructions to send a text message, an email, a telephone call that plays an automated message, and a social media based message to a second user indicating that the at least one line of code was changed and that additional lines of code are unchanged in response to the detecting the change to the at least one line of code, wherein the program instructions are stored on the computer readable storage medium for execution by the processor via the computer readable memory.

17. The system of claim 16, wherein the plural predefined types of metadata tags include:
   a second type that indicates at least one comment to change in response to detecting the change to the at least one line of code;
   a third type that indicates a specified user to alert in response to detecting the change to the at least one line of code; and
   a fourth type that indicates a potential race condition in response to detecting the change to the at least one line of code.

18. The system of claim 16, wherein:
   the first user input selecting the at least one line of code and the second user input selecting the one of the plural predefined types of metadata tags are received from a first user via a first instance of the client source code editor program; and
   the change to the at least one line of code is detected as being made by a second user via a second instance of the client source code editor program.

19. The system of claim 18, wherein the generating the alert comprises sending instruction to the second instance of the client source code editor program to display the alert in the user interface in real time or near real time as the change to the at least one line of code is detected as being made and the first message to the first user includes a social media based message to the first user.

20. The method of claim 3, wherein the user interface of the client source code editor program includes an option by which a user may provide input to selectively switch the metadata tags between visible and invisible in the user interface.

\* \* \* \* \*